United States Patent
Overby et al.

(10) Patent No.: US 7,526,619 B1
(45) Date of Patent: Apr. 28, 2009

(54) METHOD FOR PROVIDING EMULATED FLEXIBLE MAGNETIC STORAGE MEDIUM USING NETWORK STORAGE SERVICES

(75) Inventors: Mark A. Overby, Bothell, WA (US); Andrew Currid, Alameda, CA (US)

(73) Assignee: NVIDIA Corporation, Santa Clara, CA (US)

( * ) Notice: Subject to any disclaimer, the term of this patent is extended or adjusted under 35 U.S.C. 154(b) by 296 days.

(21) Appl. No.: 11/469,975

(22) Filed: Sep. 5, 2006

(51) Int. Cl.
*G06F 13/00* (2006.01)
(52) U.S. Cl. .......................... 711/154; 711/4; 711/112
(58) Field of Classification Search .............. 711/4, 711/112, 154
See application file for complete search history.

(56) References Cited

U.S. PATENT DOCUMENTS

| | | | | |
|---|---|---|---|---|
| 5,974,547 A | * | 10/1999 | Klimenko | 713/2 |
| 6,751,155 B2 | * | 6/2004 | Gorobets | 365/230.09 |
| 2004/0030668 A1 | * | 2/2004 | Pawlowski et al. | 707/1 |
| 2005/0160150 A1 | * | 7/2005 | Kao | 709/212 |
| 2007/0143611 A1 | * | 6/2007 | Arroyo et al. | 713/171 |

* cited by examiner

*Primary Examiner*—Reba I Elmore
(74) *Attorney, Agent, or Firm*—Patterson & Sheridan, LLP

(57) ABSTRACT

One embodiment of the present invention sets forth a technique for emulating a floppy disk drive using network storage services. An application executing on a diskless computing device generates INT 13 access requests to gain access to a floppy disk image residing on a storage server. The INT 13 access requests are directed to a translation function that maps cylinder head sector (CHS) addresses and commands native to floppy disk media to linear block addresses (LBA) and commands used to access data within SCSI devices. An iSCSI initiator residing within the diskless computing device directs the LBA requests to an iSCSI target residing within the storage server to access a LUN residing on the storage server that contains a floppy disk image. The application is then able to conduct access requests to the floppy disk image as though a physical floppy disk drive were present on the diskless computing device.

20 Claims, 3 Drawing Sheets

METHOD FOR PROVIDING EMULATED FLEXIBLE MAGNETIC STORAGE MEDIUM USING NETWORK STORAGE SERVICES

BACKGROUND OF THE INVENTION

1. Field of the Invention

Embodiments of the present invention relate generally to computer data storage and more specifically to a method for providing emulated flexible magnetic storage medium using network storage services.

2. Description of the Related Art

Computer hardware platforms use traditional magnetic storage media, referred to as "floppy disks," to store certain files and disk images related to system configuration, recovery and management. A floppy disk drive is a system used to access the floppy disk media. The floppy disk drive is commonly supported within the well-known x86-based personal computer (PC) system architecture via a set of standard "INT 13 BIOS services" that are provided on all standard PCs. This ubiquitous support for floppy disk drives has allowed software developers to rely on the floppy disk as the media of choice for storing certain software modules. Consequently, systems vendors typically use floppy disk drive media to store driver software used to configure low-level aspects of system hardware.

Recently, however, a new diskless computing device market has developed where the floppy disk drive is arguably a costly legacy hardware component. Nonetheless, certain software, particularly installation software used to initially configure a diskless computing device, is oftentimes still configured so that it can be accessed only by using a floppy disk. For this reason, diskless computing devices oftentimes still include floppy disk drives.

As the foregoing illustrates, what is needed in the art is a technique for supporting floppy disk media access on diskless computing platforms so that true diskless computing devices, without floppy disks, can be effectively implemented.

SUMMARY OF THE INVENTION

One embodiment of the present invention sets forth a method for emulating flexible magnetic storage medium services on a network storage server. The method includes the steps of receiving an INT 13 services command reflecting a disk drive cylinder-head-sector (CHS) request, translating a CHS block address associated with the INT 13 services command to a linear block address (LBA), and translating the INT 13 services command to a corresponding small computer system interface (SCSI) command. The method also includes the step of generating an internet SCSI (iSCSI) request command data block (CDB) based on the LBA that encapsulates the SCSI command.

One advantage of the disclosed method is that it effectively gives an application executing on a diskless computing device direct access to a logical unit number (LUN) within a storage server, allowing INT floppy disk requests to be processed as though the requests were being handled directly by a local floppy disk drive attached to the diskless computing device, but without the associated expense or inefficiencies of a local floppy drive.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
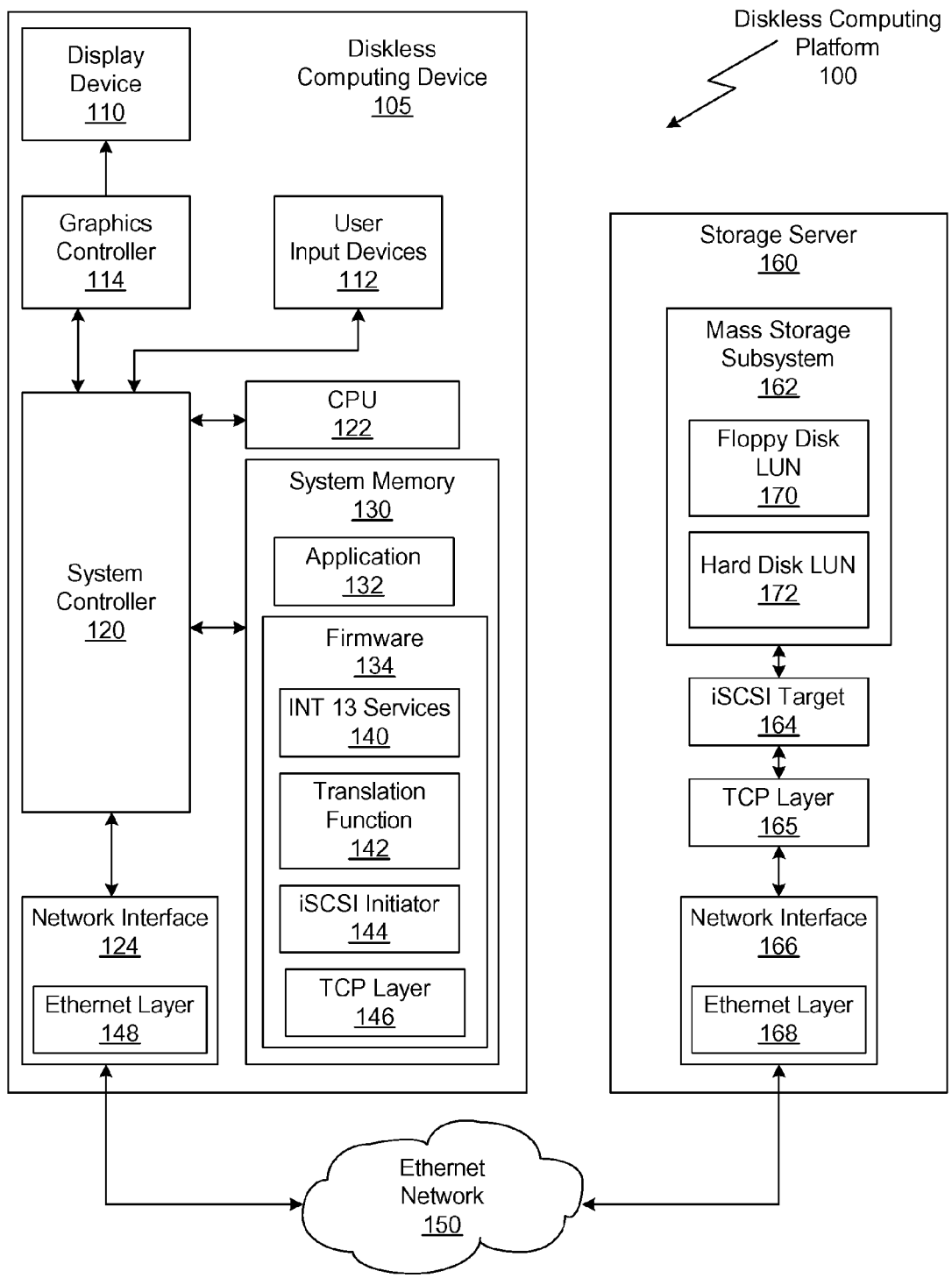
FIG. 1 is a conceptual diagram of a diskless computing platform, according to one embodiment of the invention.

FIG. 1 is a conceptual diagram of a diskless computing platform 100, according to one embodiment of the invention, that includes a diskless computing device 105, a storage server 160 and an Ethernet network 150. As shown, the diskless computing device 105 includes, without limitation, a display device 110, user input devices 112, a graphics controller 114, a system controller 120, a central processing unit (CPU) 122, a system memory 130 and a network interface 124. The display device 110 is configured to display frames of data and may be constructed from a liquid crystal display (LCD), cathode ray tube (CRT) or any other suitable display technology. The user input devices 112 allow a user to enter data into the diskless computing device 105. User input devices 112 may include, without limitation, a computer keyboard, mouse, joystick, trackball or capacitive input pad. The graphics controller 114 generates and displays frames of data on the display device 110. The graphics controller 114 receives graphics display commands from code executing on the CPU 122 via a bus interface on the system controller 120, which bridges communication between the major functional blocks within the diskless computing device 105. The CPU 122 executes code, residing in system memory 130, used to manage and operate the diskless computing device 105. System memory may include dynamic random access memory (DRAM) or any other appropriate memory technology. The network interface 124 provides connectivity to an external network and presents a host bus interface to the system controller 120. An Ethernet layer 148, within the network interface 124, provides standard Ethernet processing of incoming and outgoing frames of data.

As also shown, the system memory 130 includes, without limitation, an application 132 and firmware 134. The application 132 may perform any useful task. For example, the application may install support software configured to manage a hardware element residing within the diskless computing device 105. The support software may include drivers or tools that provide installation, configuration or diagnostic functionality. A set of routines within firmware 134 provides services to the application 132 that include, without limitation, input/output access to standard devices such as floppy disk drives. The services are provided through the well-known "INT" interface. Mass storage devices, such as floppy disk drives, are accessed through a set of standard INT 13 floppy disk services 140. In prior art systems, the INT 13 floppy disk services only provided access to floppy disk drives that were physically and locally attached to their respective computing device. However, with the introduction of a translation function 142 and an iSCSI initiator 144 within the firmware 134, the diskless computing device 105 may extend the INT 13 floppy disk services to include access to network-attached iSCSI-based storage services. TCP processing and state maintenance is provided to the iSCSI initiator 144 by a TCP layer 146, also residing within firmware 134.

The translation function 142 maps cylinder head sector (CHS) addresses, native to floppy disk media, to linear block addresses (LBA) used to access data within SCSI devices. The translation function 142 implements the following mapping function to map a native CHS floppy disk block address to a native LBA iSCSI address:

$$LBA=(cylinder*36)+head+(sector*2) \quad \text{(Equation 1)}$$

The translation function 142 also maps native INT 13 sub function numbers, associated with native floppy disk commands, to SCSI commands for presentation to the iSCSI initiator 144. The specific command mapping is shown below in Table 1:

TABLE 1

| Interrupt 13 Sub Function Number | Name of Function | SCSI Command to Issue |
| --- | --- | --- |
| 00h | Reset Disk Subsystem | None |
| 01h | Get Last Status | REQUEST SENSE |
| 02h | Read Sectors | READ(6) |
| 03h | Write Sectors | WRITE(6) |
| 04h | Verify Sectors | VERIFY(10) |
| 08h | Get Drive Parameters | INQUIRY |
| 0Ch | Seek to Cylinder | PREFETCH(10) |
| 11h | Recalibrate | PREFETCH(10) |
| 15h | Get DiskType | None |

Using any known technique, the iSCSI initiator 144 is configured to log into an iSCSI target 164 residing within the storage server 160 to access a storage space, referred to as a logical unit number (LUN), within the storage server 160. As described in greater detail herein, once the iSCSI initiator 144 has gained access to a specific LUN, the iSCSI initiator 144 is able to issue SCSI commands, such as those shown in Table 1, to the iSCSI target 164 that are analogous to the INT 13 floppy disk requests transmitted by the application 132 when attempting to access floppy disk media. The iSCSI target 164 processes the SCSI commands and accesses the LUN in accordance with the INT 13 floppy disk requests. Such an approach effectively gives the application 132 direct access to the LUN within the storage server 160, allowing the INT 13 floppy disk requests to be processed as though the requests were being handled directly by a local floppy disk drive attached to the diskless computing device 105, but without the associated expense or inefficiencies of a local floppy drive.

The storage server 160 includes, without limitation, a mass storage subsystem 162, the iSCSI target 164 and a network interface 166. The mass storage subsystem 162 includes at least one LUN, for example a floppy disk LUN 170 and/or a hard disk LUN 172. The floppy disk LUN 170 is configured to store the contents of a single piece of floppy disk media, for example, one standard 1.44 megabyte 3.5" floppy disk. The floppy disk LUN 170 is accessed using the standard SCSI LBA addressing scheme. The hard disk LUN 172 may provide a boot image or storage space for the diskless computing device 105. The iSCSI target 164 conforms to well-known iSCSI target standards. The network interface 166 provides physical and network protocol connectivity between the storage server 160 and an external network, such as the Ethernet network 150.

The Ethernet network 150 connects the diskless computing device 105 to the storage server 160 and may include Ethernet switches, Ethernet hubs and Ethernet cabling. The Ethernet cabling may include any Ethernet physical transport media such as twisted pair or fiber optical cable.

Figure 2:
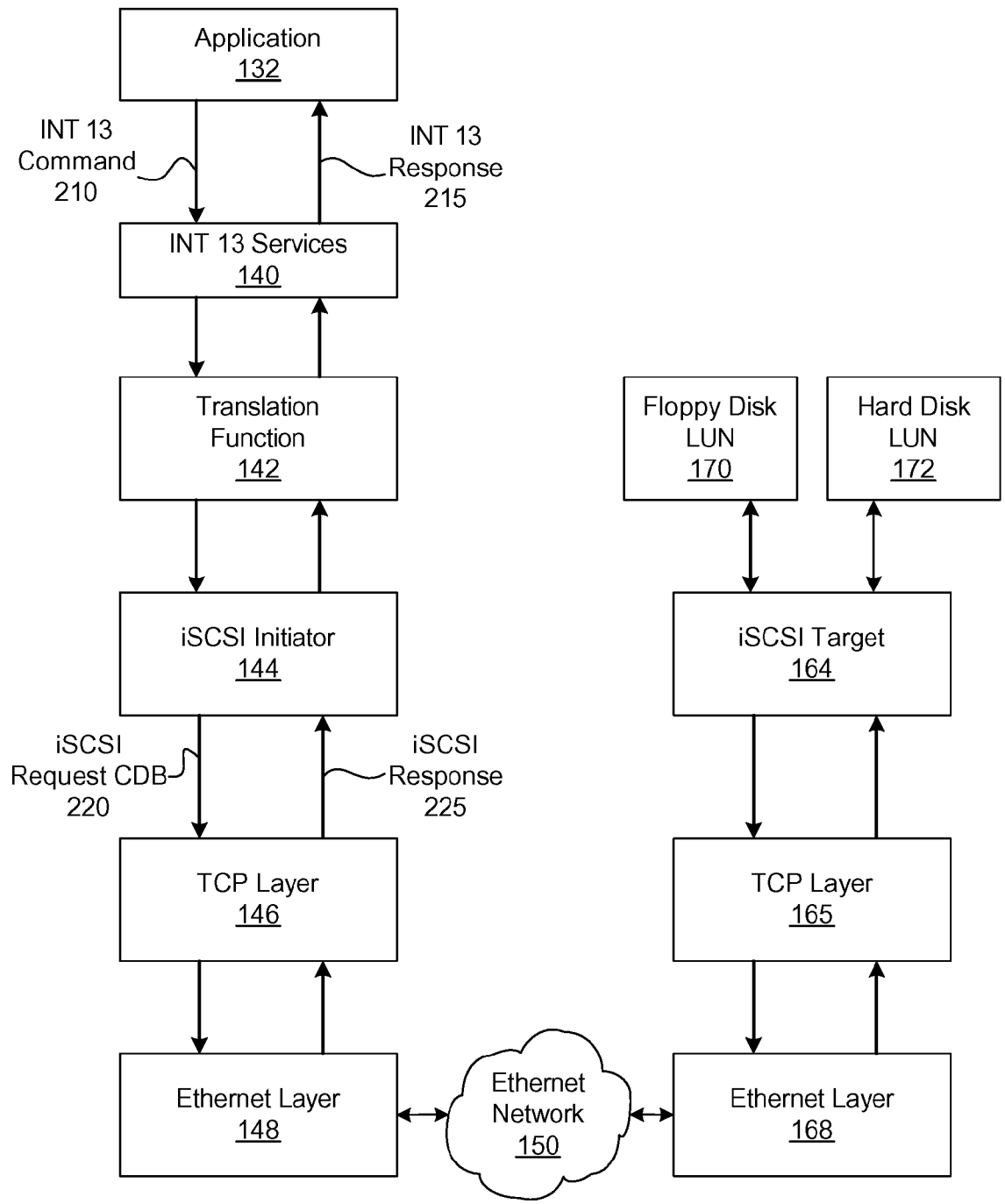
FIG. 2 is a conceptual diagram of data flow through the diskless computing platform, according to one embodiment of the invention.

FIG. 2 is a conceptual diagram of data flow through the diskless computing platform 100, according to one embodiment of the invention. Again, for purposes of discussion, it is assumed that during an initialization phase, the iSCSI initiator 144 performs an iSCSI login to the iSCSI target 164 to establish a login session with the floppy disk LUN 170 using any known technique. Subsequent access requests by the iSCSI initiator 144 are directed by the iSCSI target 164 to the floppy disk LUN 170.

As shown, the application 132 generates a sequence of floppy disk commands, referred to as "INT 13 commands" 210. The INT 13 commands are transmitted to an implementation of the standard INT 13 floppy disk services 140. Each of the INT 13 commands 210 is then transmitted to the translation function 142. For each INT 13 command, the translation function 142 maps the CHS address space to the LBA address space using Equation 1, set forth above, and also maps the INT 13 sub function number corresponding to the INT 13 command to a native SCSI command using the translations set forth above in Table 1. The native SCSI commands are transmitted to the iSCSI initiator 144, which generates an iSCSI request command data block (CDB) 220. The iSCSI request CDB 220 is processed by a TCP layer 146 that resides within the diskless computing device 105. The TCP layer 146 transmits the iSCSI request CDB 220 to an Ethernet layer 148 that resides within the network interface 124 of the diskless computing device 105. The Ethernet layer 148 transmits the iSCSI request CDB 220, in the form of one or more Ethernet frames, through the Ethernet network 150 to an Ethernet layer 168 that resides within the network interface 166 of the storage server 160. The iSCSI request CDB 220 is then passed from the Ethernet layer 168 to a TCP layer 165 that resides within the storage server 160. The TCP layer 165 performs well-known packet and connection processing, according to the standard TCP specification, to receive the iSCSI request CDB 220 before passing the iSCSI request CDB 220 to the iSCSI target 164.

Upon receiving the iSCSI request CDB 220, the iSCSI target 164 processes the iSCSI request CDB 220 according to well-known iSCSI standards. The iSCSI target 164 accesses the floppy disk LUN 170 in accordance with the INT 13 commands 210 and also generates an iSCSI response 225. The iSCSI response 225 is transmitted from the iSCSI target 164 back through the TCP layers 165 and 146 to the iSCSI initiator 144. The iSCSI initiator 144 passes the iSCSI response 225 to the translation function 142, which then generates an INT 13 response 215 corresponding to the INT 13 commands 210.

As an example, suppose the application 132 performs a read request using an INT 13 command, corresponding to the INT 13 sub function number 02h with a CHS address of cylinder 2, head 0, sector 7. In processing this INT 13 command, the translation function 142 performs two translations. The first translation maps the INT 13 sub function number 02h to the SCSI READ (6) command, as indicated in Table 1. The SCSI READ (6) command is a standard command that includes 6 bytes and is limited to a 21-bit LBA. A 21-bit LBA is more than adequate to address the contents of a floppy disk. The second translation maps the CHS address (2, 0, 7) to the corresponding LBA address 79 (79=2*36+0+7) using Equation 1. The LBA address 79 is requested by the iSCSI initiator 144 within an iSCSI request CDB 220, which is transported to the iSCSI target 164 using well-known TCP principles. The iSCSI target 164 then accesses the floppy disk LUN 170 to retrieve the contents of LBA block 79. The iSCSI target 164 forms a response that includes the contents of LBA block 79, and transmits the response in the form of the iSCSI response 225 back to the iSCSI initiator 144. The iSCSI initiator 144 transmits the iSCSI response 225 to the translation function 142, which generates an INT 13 response 215 through the INT 13 floppy disk services 140 layer to the application 132.

Figure 3:
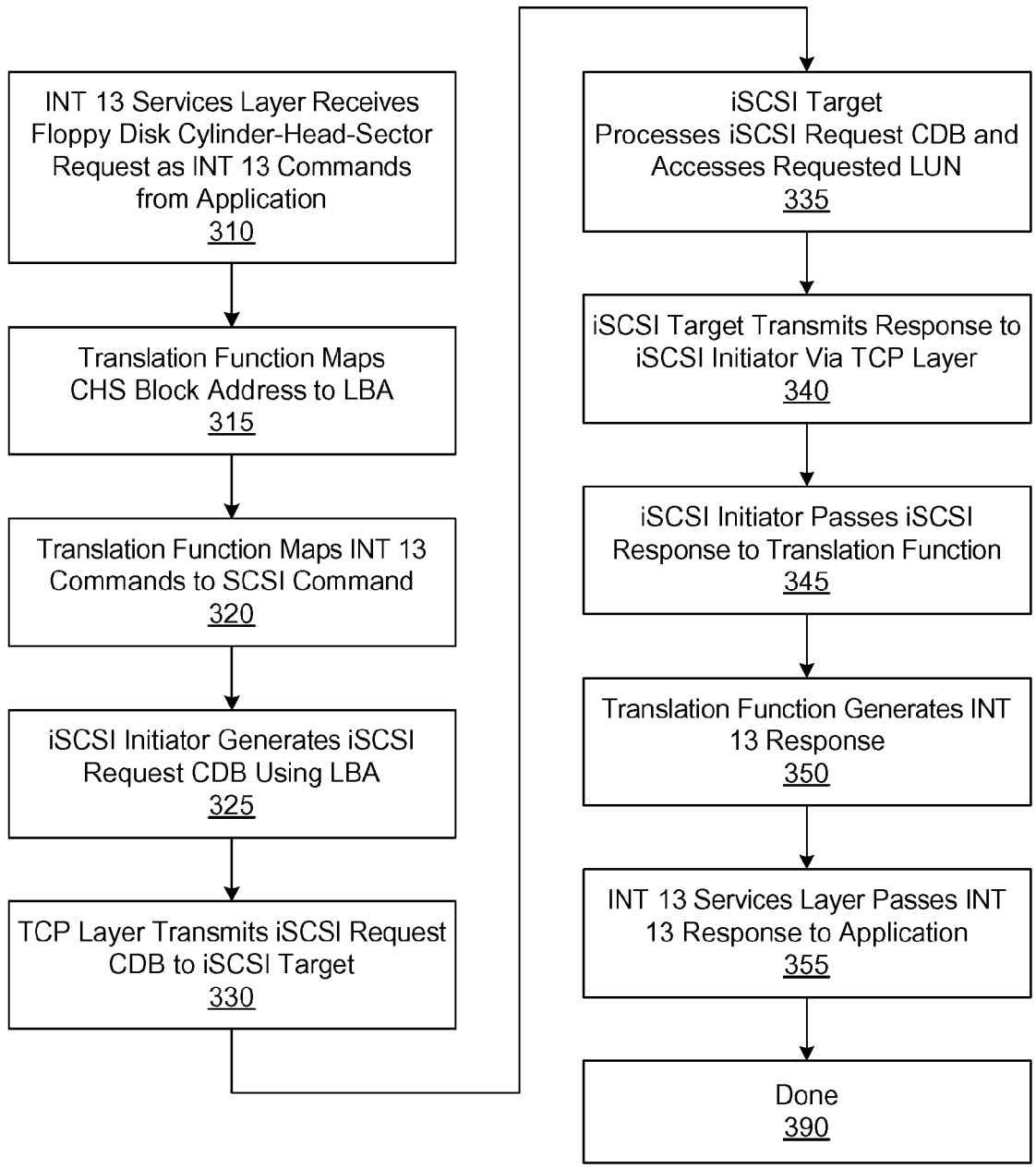
FIG. 3 is a flow diagram of method steps for emulating a floppy disk drive using network iSCSI services, according to one embodiment of the invention.

FIG. 3 is a flow diagram of method steps for emulating a floppy disk drive using network iSCSI services, according to one embodiment of the invention. Although the method steps are described in conjunction with the systems of FIGS. 1 and 2, persons skilled in the art will understand that any entity or element within the diskless computing platform 100, whether implemented in software, hardware or both, that performs the method steps, in any order, is within the scope of the invention. One should note that the methods steps described herein presuppose the iSCSI initiator 144 residing within the diskless computing device 105 has previously established a login session with the floppy disk LUN 170 residing within the storage server 160 using any known technique.

The method for emulating a floppy disk drive using network iSCSI services begins in step 310, where the INT 13 floppy disk services layer 140 of FIG. 1 receives a floppy disk CHS request from the application 132 executing on the diskless computing device 105. The floppy disk CHS request is represented as an INT 13 command, as depicted by INT 13 commands 210 of FIG. 2. In step 315, the translation function 142 maps the CHS block address, native to floppy disk access, to the corresponding LBA using Equation 1. In step 320, the translation function 142 maps the INT 13 command to a standard SCSI command using the command translations set forth in Table 1. After step 320, the floppy disk access command transmitted by the application 132 is available as a corresponding SCSI command. This corresponding SCSI command is then passed to the iSCSI initiator 144. In step 325, the iSCSI initiator 144 generates an iSCSI request CDB using the converted LBA, as depicted by iSCSI request CDB 220 of FIG. 2. In step 330, the TCP layer, including the TCP layer elements 146 and 165, transmits the iSCSI request CDB to the iSCSI target 164 residing within in the storage server 160.

In step 335, the iSCSI target 164 processes the iSCSI request CDB and accesses the floppy disk LUN 170 in accordance with the floppy disk access command transmitted by the application 132. In step 340, the iSCSI target 164 generates and transmits iSCSI response to the iSCSI initiator 144 via the TCP layer, as depicted by iSCSI response 225 of FIG. 2. In step 345, the iSCSI initiator 144 passes the iSCSI response to the translation function 142 for translation to an INT 13 response. In step 350, the translation function generates the INT 13 response, as depicted by INT 13 response 215 of FIG. 2. In step 355, the INT 13 floppy disk services layer 140 passes the INT 13 response to the application 132. The method terminates in step 390.

In sum, INT 13 floppy disk drive access requests are directed to a translation function 142, residing in firmware 134, that maps the native cylinder-head-sector addresses used in floppy disk drives to the linear block address method used in SCSI systems. The linear block address is then transmitted to the iSCSI initiator 144, also residing in firmware 134. The iSCSI initiator 144 accesses a floppy disk image stored within a floppy disk LUN residing within the storage server 160 via the iSCSI target 164. With this approach, the INT 13 floppy disk access requests are completed using storage server resources as though the requests were handled by a local floppy disk drive attached to the diskless computing device, but without the expense or inefficiencies of a physical floppy disk drive. Importantly, the application 132 operates without modification whether accessing a physical floppy disk drive locally connected to the diskless computing device 105 or the emulated floppy disk drive enabled by this invention.

While the forgoing is directed to embodiments of the present invention, other and further embodiments of the invention may be devised without departing from the basic scope thereof, and the scope thereof is determined by the claims that follow.

We claim:

1. A method implemented on a diskless computing device for emulating flexible magnetic storage medium services on a network storage server, the method comprising:
   receiving an INT 13 services command reflecting a disk drive cylinder-head-sector (CHS) request;
   translating a CHS block address associated with the INT 13 services command to a linear block address (LBA);
   translating the INT 13 services command to a corresponding small computer system interface (SCSI) command; and
   generating an internet SCSI (iSCSI) request command data block (CDB) based on the LBA and the SCSI command for transmission to the network storage server to access data stored on the network storage server.

2. The method of claim 1, further comprising the step of transmitting the iSCSI request CDB to an iSCSI target residing within the network storage server.

3. The method of claim 2, wherein the step of transmitting includes passing the iSCSI request CDB to a transmission control protocol (TCP) layer, which passes the iSCSI request to an Ethernet layer.

4. The method of claim 2, further comprising the steps of processing the iSCSI request CDB and accessing a logical unit number (LUN) residing within the storage server in accordance with the INT 13 services command.

5. The method of claim 4, further comprising the steps of generating an iSCSI response to indicate that the iSCSI request CDB has been processed and transmitting the iSCSI response to an iSCSI initiator for processing.

6. The method of claim 1, wherein the step of translating a CHS block address to an LBA includes using the following equation, LBA=(cylinder*36)+head+(sector*2).

7. A computer-readable medium including instructions that when executed cause a computing device to access emulated flexible magnetic storage medium services on a network storage server, by performing the steps of:
   receiving an INT 13 services command reflecting a disk drive cylinder-head-sector (CHS) request;
   translating a CHS block address associated with the INT 13 services command to a linear block address (LBA);
   translating the INT 13 services command to a corresponding small computer system interface (SCSI) command; and
   generating an internet SCSI (iSCSI) request command data block (CDB) based on the LBA and the SCSI command for transmission to the network storage server to access data stored on the network storage server.

8. The computer-readable medium of claim 7, further comprising the step of transmitting the iSCSI request CDB to an iSCSI target residing within the network storage server.

9. The computer-readable medium of claim 8, wherein the step of transmitting includes passing the iSCSI request CDB to a transmission control protocol (TCP) layer, which passes the iSCSI request to an Ethernet layer.

10. The computer-readable medium of claim 7, wherein the step of translating a CHS block address to an LBA includes using the following equation, LBA=(cylinder*36)+head+(sector*2).

11. A diskless computing platform for accessing emulated flexible magnetic storage medium services over a network, the diskless computing platform comprising:
   a diskless computing device having:
      a host processor; and
      a system memory coupled to the host processor and configured to store at least a portion of:
         an application configured to transmit an INT 13 services command reflecting a disk drive cylinder-head-sector (CHS) request,
         an INT 13 services layer configured to receive the INT 13 services command from the application,
         a translation function configured to translate a CHS block address associated with the INT 13 services command to a linear block address (LBA) and to translate the INT 13 services command to a corresponding small computer system interface (SCSI) command, and
         an iSCSI initiator configured to generate an internet SCSI (iSCSI) request command data block (CDB) based on the LBA and the SCSI command for transmission across the network.

12. The diskless computing platform of claim 11, wherein the system memory is further configured to store a transmission control protocol (TCP) layer configured to pass the iSCSI request CDB to a first Ethernet layer.

13. The diskless computing platform of claim 12, further comprising a first network interface that includes the first Ethernet layer.

14. The diskless computing platform of claim 13, further comprising a storage server having a second network interface that includes a second Ethernet layer, wherein the first Ethernet layer is configured to transmit the iSCSI request CDB to the second Ethernet layer.

15. The diskless computing platform of claim 14, wherein the storage server has an iSCSI target configured to receive and process the iSCSI request CDB.

16. The diskless computing platform of claim 15, wherein the iSCSI target is further configured to access a logical unit number (LUN) residing within the storage server in accordance with the INT 13 services command.

17. The diskless computing platform of claim 16, wherein the LUN residing within the storage server is a floppy disk LUN.

18. The diskless computing platform of claim 16, wherein the iSCSI target is further configured to generate an iSCSI response to indicate that the iSCSI request CDB has been processed and to transmit the iSCSI response to the iSCSI initiator.

19. The diskless computing platform of claim 18, wherein the iSCSI initiator is configured to pass the iSCSI response to the translation function, and the translation function is configured to translate the ISCSI response to an INT 13 response and to transmit the INT 13 response to the application.

20. The diskless computing platform of claim 11, wherein the translation function translates a CHS block address to an LBA includes using the following equation, LBA=(cylinder*36)+head+(sector*2).

* * * * *